Aug. 14, 1928.
A. M. NUGENT
GROUND FITTING
Filed April 20, 1927
1,681,129
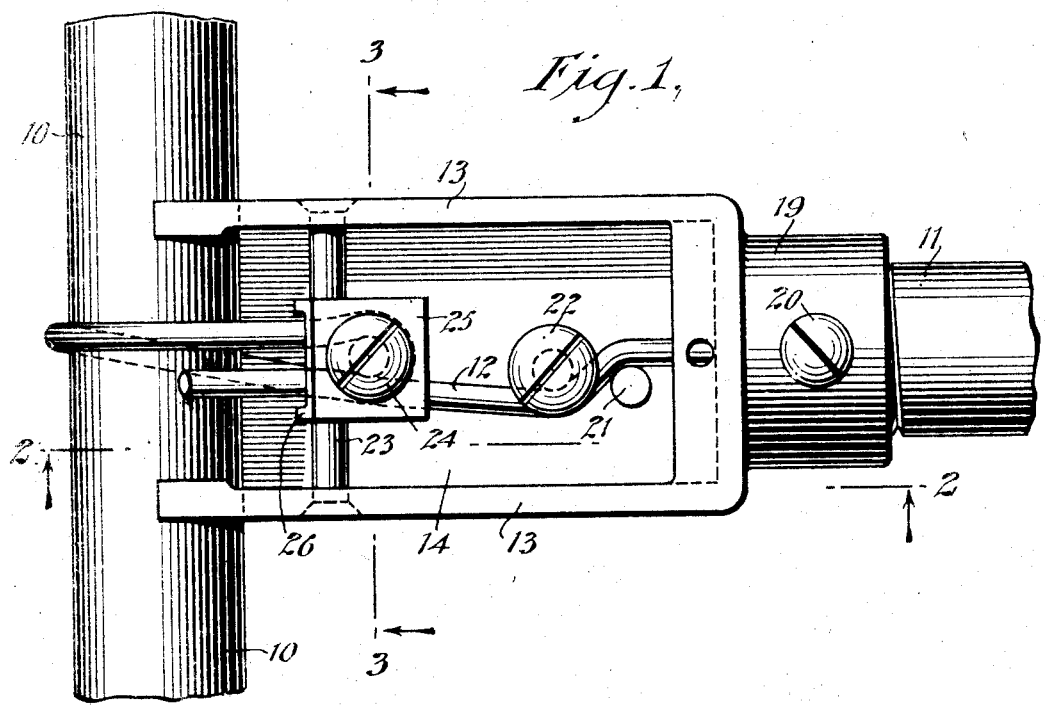
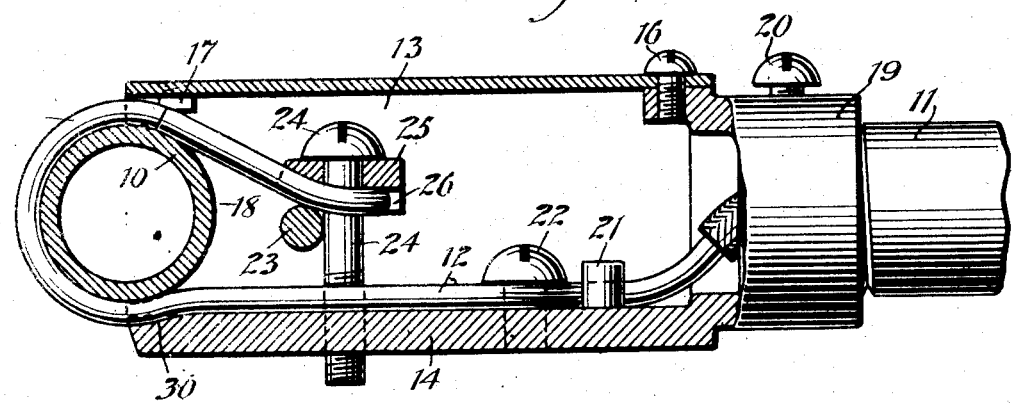
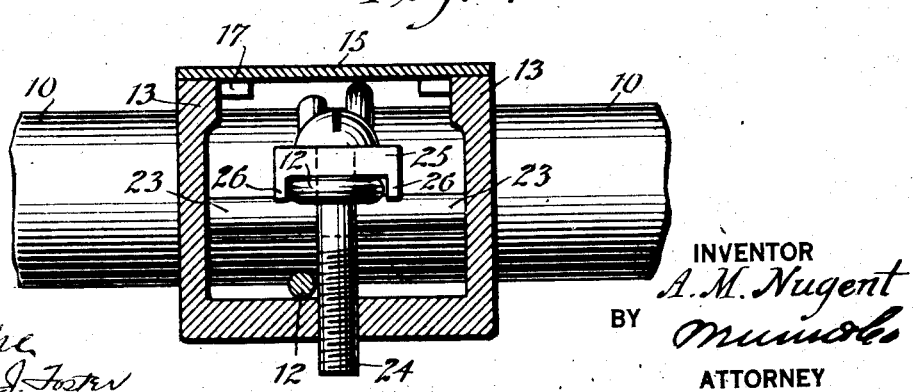
WITNESSES
Edw. Thorpe
Franklin J. Foster
INVENTOR
A. M. Nugent
BY
ATTORNEY Patented Aug. 14, 1928.

1,681,129

UNITED STATES PATENT OFFICE.

ALAN M. NUGENT, OF UNIONVILLE, NEW YORK.

GROUND FITTING.

Application filed April 20, 1927. Serial No. 185,291.

The fitting of the present invention is primarily intended for use in connection with polarized service for grounding the neutral or so-called white wire on a water pipe ground rod or the like without the use of solder or adjusting straps.

An object of the invention is to provide a device so arranged that the wire to be grounded will serve as a containing locking device to lock the fitting to the ground pipe or rod, thereby materially simplifying the connection of the wire to the ground and assuring a good connection.

Objects of the invention are to provide a fitting of this character of simple, practical construction which will be rugged, durable an efficient in use, easy to manipulate, and well suited to the requirements of economical manufacture.

With the above noted and other objects in view, the invention consists in certain novel features of construction and combinations and arrangements of parts, as will be more fully hereinafter set forth and pointed out in the claims. The invention may be more fully understood from the following description in connection with the accompanying drawings, wherein—

Fig. 1 is a top plan view showing the fitting of the present invention in operative position with a wire grounded on a pipe, the cover of the fitting being removed.

Fig. 2 is a longitudinal sectional view on the line 2—2 of Fig. 1.

Fig. 3 is a transverse sectional view on the line 3—3 of Fig. 1.

In the drawings I have used the reference numeral 10 to designate a water pipe or ground pipe, and 11 to indicate an electrical conduit from which extends the wire 12 to be grounded on the pipe. The present invention is concerned principally with the fitting for retaining the wire 12 in proper contact with the member 10. The fitting is of general box-like construction including side walls 13, a relatively heavy bottom 14, and a removabe cover 15 preferably attached by a screw 16, and retained against lateral movement by lugs 17 entering between the box walls 13. One end of the fitting is open, and the side walls at this end of the fitting are provided with arcuate recesses 18 adapted to snugly fit the pipe 10. The other end of the box is provided with an internally threaded extension 19 adapted to receive the end of the conduit 11 and carrying a set screw 20 which firmly clamps the conduit in place.

Near the inner end of the box-like fitting, a pair of snubbing posts 21 and 22 are provided. Post 21 is preferably in the nature of a stud cast integral with the box bottom, while the post 22 is in the nature of a headed screw. The wire 12 passing between the snubbing posts may be firmly clamped by the screw for a purpose which will be more fully hereinafter described.

Adjacent the other end of the box, the side walls 13 are braced by a transversely extending cross bar 23. This bar incidentally serves to relieve forward bending strains on a screw 24 mounted for adjustment in the box bottom, and carrying a square washer 25 having depending side flanges 26.

The screw and its associated washer are used for engaging the twisted end of the wire 12 and drawing the wire into tight engagement with the pipe 10 which it encircles. Preferably the wire 12 having passed between the snubbing posts 21 and 22 is led along the bottom of the box, passes through a depression or recess 30 in the edge of the box bottom, is thence bent upwardly around the pipe 10 and rearwardly, the free end of the wire passing around the screw 24, so that the screw is encircled by the looped free end of the wire. The two runs of this loop are embraced by the flanges of the washer 25 to prevent spreading of the loop, and it will be apparent that by screwing the screw 24 downwardly, the wire will be drawn very snugly around the pipe 18, tightly clamping the fitting to the pipe. The snubbing posts 21 and 22 prevent the wire 12 from being pulled out of the conduit by the action of sinking the screw 24 home, and when the screw has been moved to the position of Fig. 2, the looped wire end will be clamped between the washer and the cross bar 23. Incidentally, this cross bar in addition to bracing the fitting and serving as the stationary member of a wire clamp, braces the screw 24 against forward bending strains as the wire is being tightened about the pipe, and renders the operation of sinking the screw home, a very easy one.

Obviously, various changes and alterations might be made in the general form and arrangement of parts described without departing from the invention. Hence I do not wish to limit myself to the details set forth, but shall consider myself at liberty to make such changes and alterations as fairly fall within the spirit and scope of the appended claims.

I claim:

1. A ground fitting including a box-like housing open at one end and shaped at said open end to snugly fit a ground pipe or the like, and adapted at its other end for connection with the end of an electrical conduit, means in the casing for snubbing a wire extending out of the conduit, and means in the casing for engaging the end of said wire after it has been passed around the pipe, and tightening the wire on the pipe to thereby tightly couple the pipe and fitting.

2. A ground fitting including a box-like housing open at one end and shaped at said open end to snugly fit a ground pipe or the like, and adapted at its other end for connection with the end of an electrical conduit, means in the casing for snubbing a wire extending out of the conduit, and means in the casing for engaging the end of said wire after it has been passed around the pipe, and tightening the wire on the pipe to thereby tightly couple the pipe and fitting, said engaging and tightening means including a screw mounted in the box about which the wire end is adapted to be looped, and a flanged washer on the screw preventing spreading of the looped wire end.

3. A ground fitting including a box-like housing open at one end and shaped at said open end to snugly fit a ground pipe or the like, and adapted at its other end for connection with the end of an electrical conduit, means in the casing for snubbing a wire extending out of the conduit, and means in the casing for engaging the end of said wire after it has been passed around the pipe, and tightening the wire on the pipe to thereby tightly couple the pipe and fitting, said engaging and tightening means including a screw mounted in the box about which the wire end is adapted to be looped, and a flanged washer on the screw preventing spreading of the looped wire end, a cross bar bracing the box and against which the looped end of wire is clamped by the washer as the screw is operated to tighten the wire about the pipe.

4. A ground fitting including a box-like housing open at one end and shaped at said open end to snugly fit a ground pipe or the like, and adapted at its other end for connection with the end of an electrical conduit, means in the casing for snubbing a wire extending out of the conduit, and means in the casing for engaging the end of said wire after it has been passed around the pipe, and tightening the wire on the pipe to thereby tightly couple the pipe and fitting, said snubbing means including a pair of snubbing posts rising from the bottom of the housing.

5. A ground fitting including a box-like housing open at one end and shaped at said open end to snugly fit a ground pipe or the like, and adapted at its other end for connection with the end of an electrical conduit, means in the casing for snubbing a wire extending out of the conduit, and means in the casing for engaging the end of said wire after it has been passed around the pipe, and tightening the wire on the pipe to thereby tightly couple the pipe and fitting, said snubbing means including a pair of snubbing posts rising from the bottom of the housing, one of said posts comprising an adjustable headed screw adapted to clamp the wire against the bottom of the housing.

ALAN M. NUGENT.